(12) United States Patent
Schwartz (10) Patent No.: US 6,737,646 B2
(45) Date of Patent: May 18, 2004

(54) ENHANCED SCANNING PROBE MICROSCOPE AND NANOLITHOGRAPHIC METHODS USING THE SAME

(75) Inventor: Peter V. Schwartz, San Luis Obispo, CA (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 10/163,068

(22) Filed: Jun. 4, 2002

(65) Prior Publication Data

US 2003/0007242 A1 Jan. 9, 2003

Related U.S. Application Data

(63) Continuation-in-part of application No. 10/087,295, filed on Mar. 1, 2002.
(60) Provisional application No. 60/295,962, filed on Jun. 4, 2001.

(51) Int. Cl.$^7$ .................. G12B 21/00; G01N 13/10
(52) U.S. Cl. .................. 250/306; 250/492.3; 73/105
(58) Field of Search .................. 250/306, 492.3, 250/442.11; 73/105

(56) References Cited

U.S. PATENT DOCUMENTS

| 5,200,616 | A | * | 4/1993 | Kokawa et al. ............ 250/306 |
| 5,306,918 | A | * | 4/1994 | Goudonnet et al. ..... 250/442.11 |
| 5,705,814 | A | * | 1/1998 | Young et al. ................ 250/306 |
| 5,714,756 | A | * | 2/1998 | Park et al. .................. 250/306 |
| 6,093,930 | A | * | 7/2000 | Boyette et al. ............. 250/306 |

OTHER PUBLICATIONS

Piner et al., "'Dip–Pen' Nanolithography", Science, vol. 283, Jan. 29, 1999, pp. 661–663.*

* cited by examiner

Primary Examiner—Jack Berman
(74) Attorney, Agent, or Firm—Sheridan Ross P.C.

(57) ABSTRACT

An enhanced scanning probe microscope is provided with means for controlling the atmosphere surrounding the probe tip and the sample or surface to be scanned. Additional enhancements include a tip holder which can be tuned to reflect the laser light of the apparatus on the photodiode, a brace to stabilize the optical microscope relative to the sample and a mirror placed to allow visualization of the sample and tip from the side. Also provided is an enhanced method of nanolithography using an enhanced scanning probe microscope in which it is possible to control the atmosphere surrounding the probe tip and the substrate to be patterned or etched.

1 Claim, 7 Drawing Sheets

MECHANICAL FEEDTHROUGHS

ENHANCED SCANNING PROBE MICROSCOPE AND NANOLITHOGRAPHIC METHODS USING THE SAME

CROSS-REFERENCE TO RELATED APPLICATIONS

This application claims Priority to provisional application No. 60/295,962, filed Jun. 4, 2001, the complete disclosure of which is incorporated herein by reference, and is continuation-in-part of copending U.S. patent application No. 10/087,295, filed Mar. 1, 2002, the complete disclosure of which is incorporated herein by reference.

STATEMENT REGARDING FEDERALLY SUPPORTED RESEARCH AND DEVELOPMENT

This invention was made in part with Government support under Grant Number F49620-99-1-0071 awarded by the Air Force Office of Scientific Research (AFOSR). The Government has certain rights in the invention.

FIELD OF THE INVENTION

The invention is directed to an improved scanning probe microscope for use in scanning microscope and lithography applications and methods of using the same.

BACKGROUND OF THE INVENTION

Dip-Pen Nanolithography refers to the direct transport of a molecular ink to a substrate and has shown potential as a fast, simple, surface patterning technology with a variety of molecules. DPN is conducted by transporting the molecular ink from an atomic force microscope (AFM) tip to a substrate.

Scanning probe microscopes (SPMs) are a family of instruments used for studying surface properties of materials from the atomic to the micron level. The atomic force microscope probes the surface of a sample with a sharp tip, a couple of microns long and often less than 100 Å in diameter. The tip is located at the free end of a cantilever that is typically 100 to 200 $\mu$m long. Forces between the tip and the sample surface cause the cantilever to bend, or deflect. A detector measures the cantilever deflection as the tip is scanned over the sample, or the sample is scanned under the tip. The measured cantilever deflections allow a computer to generate a map of surface topography. Several forces typically contribute to the deflection of an AFM cantilever including repulsive forces arising from interatomic forces between the cantilever and the sample and attractive van der Waals forces. Additionally, the deflection of the AFM cantilever is minimized through the feedback of the AFM.

In contact AFM mode, an AFM tip makes soft "physical contact" with the sample. The tip is attached to the end of a cantilever with a low spring constant, lower than the effective spring constant holding the atoms of the sample together. As the scanner gently traces the tip across the sample (or the sample under the tip), the contact force causes the cantilever to bend to accommodate changes in topography of the scanned sample. In AFM this means that when the cantilever pushes the tip against the sample, the cantilever bends rather than forcing the atoms of the tip closer to the atoms of the sample. Even if you design a very stiff cantilever to exert large forces on the sample, the interatomic separation between the tip and sample atoms is unlikely to decrease much. Instead, the sample surface is likely to deform.

In addition to the repulsive and attractive forces described above, two other forces are generally present during contact AFM operation: a capillary force exerted by the thin water layer often present in an ambient environment, and the force exerted by the cantilever itself The capillary force arises due to the thickness of the meniscus, which is a function of humidity, and acts to hold the tip in contact with the surface. The magnitude of the capillary force depends upon the tip-to-sample separation. The force exerted by the cantilever is like the force of a compressed spring. The magnitude and sign (repulsive or attractive) of the cantilever force depends upon the deflection of the cantilever and upon its spring constant. As long as the tip is in contact with the sample, the capillary force should be constant because the distance between the tip and the sample is virtually incompressible assuming that the water layer is reasonably homogeneous. The variable force in contact AFM is the force exerted by the cantilever. The total force that the tip exerts on the sample is the sum of the capillary plus cantilever forces, and will be enhanced or offset by the repulsive and attractive forces discussed above. The magnitude of the total force exerted on the sample varies. Control of the surrounding atmosphere while conducting SPM is very important from a standpoint of both imaging and manipulating a scanned surface. Relative humidity, temperature and the presence of other vapors affects every day operation. Furthermore, surface manipulation techniques, such as Dip Pen Nanolithography (DPN) (R. D. Piner, J. Shu, S. Hong, C. A. Mirkin, "Dip-Pen" Nanolithography, Science, 283, 661-663, 1999; Schwartz, P. V. Langmuir, 2002, 18, 4041, both of which are incorporated herein by reference in their entirety), Meniscus Force Nanografting (MFN) (described in Provisional Patent Application No. 60/243,168 incorporated herein by reference in its entirety) and High Force Nanografting (HFN) (Schwartz, P. V. Langmuir (2001) 17:5971, incorporated herein by reference in its entirety) depend strongly on gas constituents, water vapor, temperature, and possibly vapors of other liquids. Thus, a need exists for a device that allows complete control over the atmospheric conditions at the SPM probe/substrate interface.

Most AFMs currently on the market detect the position of the cantilever with optical techniques. In the most common scheme, a laser beam bounces off the back of the cantilever onto a position-sensitive photodetector (PSPD). As the cantilever bends, the position of the laser beam on the detector shifts. The PSPD itself can measure displacements of light as small as 10 Å. The ratio of the path length between the cantilever and the detector to the length of the cantilever itself produces a mechanical amplification. As a result, the system can detect sub-angstrom vertical movement of the cantilever tip. In constant-force mode, the deflection of the cantilever can be used as input to a feedback circuit that moves the scanner up and down, responding to the topography by keeping the cantilever deflection constant and generating an image from the scanner's motion. Constant-force mode is generally preferred for most applications, but the laser must be reflected from the back of the AFM cantilever onto the photodiode. Depending on the sample scanned or the cantilever used (such as twisted cantilevers), the laser may not be reflected into the sensing photodiode. Therefore, a need exists for a innovation that will allow the use of different tips and different surfaces while adjusting the AFM tip cartridge to assure the reflection of the laser from the back of the AFM cantilever onto the photodiode.

Normally an SPM is used to image a surface without damaging it in any way. However, an AFM can be used to modify the surface deliberately by applying excessive force to the tip. Nanolithography techniques are disclosed in pending application Ser. No. 09/477,997 filed Jan. 5, 2000, the complete disclosure of which is incorporated herein by reference.

All commercial SPMs now include optical microscopes to help monitor the tip-to-sample approach and to select the areas of interest on the sample surface. An optical microscope enables positioning the tip quickly and accurately, exactly where the user wishes to take an SPM image. Additionally, if the very rough or oddly shaped samples (for example geological samples) or cross sections of any kind that require landing the tip on a narrow edge are to be imaged, an optical microscope is indispensable for positioning of the cantilevered tip. However, the link between the sample stage and the objective of the optical microscope is very long, resulting in a very loose mechanical connection. The optical microscope oscillates with respect to the sample causing the image to shake and resulting captured images to be blurry. Thus, a need exists for a means that allows for much higher resolution images by preventing relative movement between the optical microscope and the AFM stage.

Under normal operating conditions, an AFM tip may last for a couple of days, so changing the probe tip is a regular occurrence. However, the chips upon which cantilevers are mounted are very small and can be unwieldy to handle. New designs permit pre-aligned, pre-mounted probes to be changed with minimal alignment of the beam-bounce detection system although it is often still difficult to gain access to the tip. Thus, there exits a need for an easier means of gaining access to the AFM tip and cantilever.

SUMMARY OF THE INVENTION

One aspect of the present invention provides a device having a scanning probe microscope tip, a stage for holding a substrate and an atmosphere control enclosure defining an enclosed space. The atmosphere control enclosure surrounds the scanning probe microscope tip and the stage providing an enclosure in which the temperature, humidity and gas composition can be controlled.

Another aspect of the present invention provides a method of nanolithography including providing a substrate, providing a scanning probe microscope tip, and providing an atmosphere control enclosure defining an enclosed space. The tip is coated with a patterning compound and then used to apply the compound to the substrate so as to produce a desired pattern. The atmosphere control enclosure surrounds the scanning probe microscope tip and the substrate providing an enclosure in which in which the temperature, humidity and gas composition can be controlled.

Another aspect of the present invention provides an assembly for a scanning probe microscope tip having a tip cartridge, a tip carrier with a scanning probe microscope tip. The tip carrier is secured to the tip cartridge and a positioning mechanism for adjustably positioning the tip carrier in relation to the tip cartridge.

A further aspect of the present invention includes a scanning probe microscope having an optical microscope, a stage for holding a substrate and a stabilization brace. The stabilization brace is interposed between the optical microscope and the stage for holding a substrate to prevent relative movement between the optical microscope objective and the substrate.

DETAILED DESCRIPTION OF THE INVENTION

In an ambient environment, water wicks around the SPM tip, surrounding the tip and the sample at the point of contact with the tip. This forms a meniscus around the tip that exerts a capillary force on the tip holding the tip in contact with the sample. In this way, the presence of the this meniscus affects the resolution and speed of the scanning process. Control over the ambient environment of the tip and the sample to be scanned allows for control over the characteristics of the meniscus or even the prevention of its formation. This could be done by controlling the atmosphere of the room or enclosure containing the entire microscope, but precise control is limited in such a large space and the desired atmosphere may be toxic to researchers or prohibitively expensive to replicate on such a large scale. Therefore one embodiment of the present invention is directed to a device having a scanning probe microscope tip and a stage for the sample or substrate to be scanned enclosed in a housing allowing for control of the atmosphere immediately surrounding the SPM tip and the sample (U.S. provisional patent application No. 60/273,183, filed Mar. 2, 2001, the complete disclosure of which is incorporated herein by reference).

The scanning probe microscope tip is an extremely fine probe tip resembling a stylus that is attached to one end of a cantilever with a triangular projection that rides just above or on the surface of the sample being scanned. The tip is brought into the vicinity of the sample surface via a coarse positioning system controlling the position of the cantilever to which the tip is attached. The tip can be made of many different materials but is often metal. The tip rides above or along the surface of the sample or substrate being scanned, moving under the control of a piezoelectric scanner which moves the sample under the tip or the tip over the sample, usually in a raster pattern. In the field of nanolithography, the tip is moved under the control of a computer to precisely write or etch the desired shape. Movement of the tip is recorded by a position-sensitive photodetector (PSPD). Laser light is shown on the back or top of the tip and reflected onto the surface of the PSPD. As the tip moves up and down over the surface of the sample or substrate, the vertical position of the tip is "sensed" by the PSPD as the laser light reflected off of the top of the cantilevered tip thereby moving the reflected light across the PSPD in relation to the vertical movement of the tip. By controlling the angle of the laser light reflected off of the tip, an amplification of the movement of the tip is recorded by the PSPD.

The stage is the surface on which the sample is rested or affixed. In some SPM techniques, the sample or substrate to be scanned or etched by the tip is moved under the tip. In this case, an external computer system or similar means controls movement of the stage while the tip is held fixed, thereby moving the sample under the tip. The stage may also be attached to a positioning device to further control positioning or contact between the tip and the sample. The stage may be smooth or rough depending upon the sample to be positioned there and may include means to fix or hold the sample in place during the scan or etch by the tip. It is the close proximity of the tip and the surface of the sample that creates capillary force between the tip and the sample which, under ambient conditions, draws atmospheric water into the gap and creates a meniscus which then surrounds the tip and extends to contact the sample surface.

The atmosphere control enclosure defines an enclosed space surrounding the cantilevered tip and the substrate. The enclosure may have one or more openings connected to a means of controlling the atmosphere within the enclosure. Alternatively, the atmosphere control means may be entirely encased within the enclosure. An example would include a desiccant contained entirely within the enclosure. In this case, the enclosure may have no external openings to external atmosphere control means. Using the attached atmosphere control means, the gas content, temperature and humidity can be controlled individually or simultaneously within the enclosure. Atmosphere control means include but are not limited to heaters, coolers, gas supplies, humidifiers, dehumidifiers and monitoring devices to monitor the atmosphere in the enclosure and/or the atmosphere entering or leaving the enclosure.

Different gasses can be used to purge the enclosure thereby replacing the air surrounding the sample and the tip. Any desired gas can be used as long as it is compatible with the tip, the substrate and the enclosure materials. The gas may also be bubbled through a solvent of choice or mixed with other gasses as it is fed into the enclosure. The use of different gasses including inert gasses is particularly useful for nanolithography applications in which coatings to the substrate or the tip may react deleteriously with oxygen. Additionally, the ability to simultaneously control the humidity in the enclosure during these applications allows control over the meniscus formed, if any, between the tip and the sample or substrate.

In one embodiment of the invention, a small housing is fitted around the stage of the microscope and made airtight by means of a seal between an adapter ring and the round base of the enclosure. Gas is fed into the housing and can be expelled through another opening or via the base of the stage, as the user desires.

Figure 1:
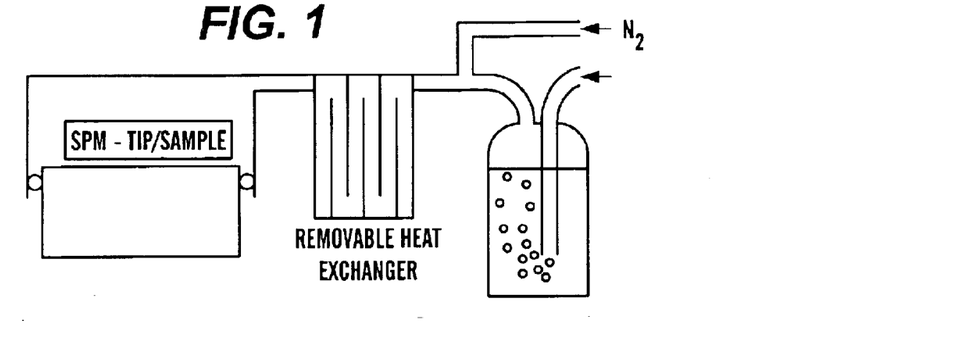
FIG. 1 shows a schematic of one embodiment of the atmosphere control enclosure including external atmosphere control means.

A schematic of one embodiment of the atmosphere control enclosure is shown in FIG. 1. The temperature of the atmosphere, and thus ultimately, the AFM can also be controlled via a removable heat exchanger. The top of the enclosure is transparent, flexible silicone rubber. It is useful for the top to be transparent so that the experimenter can see the sample during sample manipulation. It is also important that the top be flexible so that the optical microscope objective can move relative to the sample. Plexiglas® fulfills the requirement of transparency. A suitable flexible material for the top of the enclosure is transparent silicon rubber. Many other materials which are inert to the atmosphere introduced and controlled within the container will be apparent to the skilled artisan. An airtight seal is maintained between the top of the enclosure and the microscope objective by means of an "O"-ring attachment. This arrangement enables the full use of the optical microscope without hindrance of any additional surfaces between the objective and sample.

Mechanical feedthroughs allow the experimenter to manipulate the sample, adjust the photodiode position, move the AFM head and, in some newer AFM models, allow the laser position to be adjusted. The number of feedthroughs available on the enclosure is limited only by the surface area of the enclosure and the space needed within the enclosure to perform the scanning or nanolithography techniques. Preferably, the front panel is easily removed via thumbscrews, allowing the quick removal of the sample and exchange of AFM tips. The enclosure does not encumber experimental activities. In fact, certain adjustments are facilitated by the enclosure's presence. In one embodiment, feedthroughs are made by securing nipples from baby bottles to the sides of the enclosure. In another embodiment, a humidity probe is inserted through the back of the enclosure via an "O"-ring.

The small size of the enclosure allows for complete exchange of atmospheric gases in a very short time, having well under 10% of the volume of a conventional glovebox. Preferably, the internal volume is less than 5 liters and more preferably the volume is less than 3 liters. It is also very easy to install and remove the enclosure and the SPM is actually easier to control via the mechanical feedthroughs than it is to manipulate without the enclosure in place. By allowing for complete control over the atmosphere surrounding the tip and sample, the enclosure allows for increased experimental reproducibility by perfectly replicating atmospheric conditions and allowing these processes to be optimized.

DPN is a nanolithography technique by which molecules are directly transported to a substrate of interest in a positive printing mode. DPN utilizes a solid substrate as the "paper" and a scanning probe microscope (SPM) tip (e.g., an atomic force microscope (AFM) tip or a near field scanning optical microscope (NSOM) tip) as the "pen." The tip is coated with a patterning compound (the "ink"), and the coated tip is used to apply the patterning compound to the substrate to produce a desired pattern. DPN enjoys numerous advantages for depositing "nanoscale" wide mono- or multilayer molecules. The DPN delivery mechanism may involve the formation of a meniscus around the SPM tip and the control of the movement of the patterning molecules to the surfaces on which they are deposited by a driving force. Considerable recent work done in this area demonstrates the efficacy of the DPN approach to pattern monolayer molecules at the lateral width as small as 10 nm, DPN is described in pending application Ser. No. 09/477,997, filed Jan. 5, 2000, the complete disclosure of which is incorporated herein by reference.

Meniscus Force Nanografting (MFN) is a variation of High Force Nanografting in which the a patterning material is applied as a thin film on a resist-covered substrate, and an AFM tip selectively penetrates the resist, delivering the patterning material to the substrate. In MFN, surface tension of the liquid film itself can supply the constant force necessary to displace the resist molecules thereby eliminating the need for AFM feedback control.

The meniscus that is formed in these techniques affects DPN, MFN and HFN in predictable ways and is subject to variations in the relative humidity as well as chemical interactions between the solvent and the substrate. The meniscus may also affect the rate of the transport of the patterning compound to the substrate. This may require coating of the microscope tip with hydrophobic compounds if the nanolithography is to be performed in air. Solubility characteristics of the "ink" molecules in a given solvent can create difficulty in establishing a desired line width and a suitable loading concentration of the ink in the solvent. Furthermore, surface tension characteristics of different solvents can lead to drip or rapid flow from the pen leading to problems with precise control of the ink application under some circumstances. Accordingly, one embodiment of the present invention provides a method of nanolithography in which a scanning probe microscope tip is used to transfer a patterning compound from the tip to the substrate within the atmosphere controlled enclosure described above. In this way, the meniscus that forms between the tip and the substrate is controlled or even eliminated, thereby allowing additional control over the meniscus and therefore the pattern formed.

Any patterning compound can be used, provided it is capable of transferring to the substrate to modify the substrate to form stable surface structures. Stable surface structures are formed by chemisorption or physisorption of the molecules of the deposition compound onto the substrate or by covalent linkage of the molecules of the patterning compound to the substrate. Useful compounds include magnetic particles or biomolecules such as proteins, peptides, polypeptides, nucleotides, polynucleotides, nucleic acids and synthetic organic compounds. Additionally, biomolecules bound, adsorbed or absorbed to magnetic particles are particularly useful.

This method of nanolithography can be used to prepare many different patterns including arrays and including combinatorial arrays. An "array" is an arrangement of a plurality of discrete sample areas in a pattern on a substrate. The sample areas may be any shape (e.g., dots, circles, squares or triangles) and may be arranged in any pattern (e.g., rows and columns of discrete sample areas). Each sample area may contain the same or a different sample as contained in the other sample areas of the array. A "combinatorial array" is an array wherein each sample area or a small group of replicate sample areas (usually 2-4) contain(s) a sample which is different than that found in other sample areas of the array. A "sample" is a material or combination of materials to be studied, identified, reacted, etc.

This technique will be particularly useful for the preparation of arrays on the submicrometer scale. An "array on the submicrometer scale" means that at least one of the dimensions (e.g., length, width or diameter) of the sample areas, excluding the depth, is less than 1 $\mu$m. At present, the technique can be used to prepare lines that are about 2 to about 10 nm in width. Arrays on a submicrometer scale allow for faster reaction times and the use of less reagents than the currently-used microscale (i.e., having dimensions, other than depth, which are 1-999 $\mu$m) and larger arrays. Also, more information can be gained per unit area (i.e., the arrays are more dense than the currently-used micrometer scale arrays). Finally, the use of submicrometer arrays provides new opportunities for screening. For instance, such arrays can be screened with scanning probe microscopes to look for physical changes in the patterns (e.g., shape, stickiness, height) and/or to identify chemicals present in the sample areas, including sequencing of nucleic acids.

Each sample area of an array contains a single sample. For instance, the sample may be a biological material, such as a nucleic acid (e.g., an oligonucleotide, DNA, or RNA), protein or peptide (e.g., an antibody or an enzyme), ligand (e.g., an antigen, enzyme substrate, receptor or the ligand for a receptor), or a combination or mixture of biological materials (e.g., a mixture of proteins). Such materials may be attached directly on a desired substrate or each sample area may contain a compound attached for capturing the biological material. See, e.g., PCT applications WO 00/04382, WO 00/04389 and WO 00/04390, the complete disclosures of which are incorporated herein by reference. For instance, patterning compounds terminating in certain functional groups (e.g., —COOH) can bind proteins through a functional group present on, or added to, the protein (e.g., —NH$_2$). Also, it has been reported that polylysine, which can be attached to the substrate as described above, promotes the binding of cells to substrates. See James et al., Langmuir, 14, 741-744 (1998). It has further been reported that cells bind to octadecanethiol-coated surfaces. As another example, each sample area may contain a chemical compound (organic, inorganic and composite materials) or a mixture of chemical compounds. Chemical compounds may be deposited directly on the substrate or may be attached through a functional group present on a deposition compound present in the sample area. From the foregoing, those skilled in the art will recognize that a deposition compound may comprise a sample or may be used to capture a sample.

The use of an SPM requires a laser to be reflected from the back of the AFM cantilever, and detected by a photodiode. The movable photodiode array must be centered on the reflected laser beam, the position of which depends on the orientation of the back of the cantilever. However, the cantilever is often twisted at such an angle that the reflected laser is outside the range of the diode array and the cantilever is thereby rendered useless. This is particularly problematic when time is spent coating the tip, especially for certain nanolithography techniques such as Dip Pen Nanolighography, requiring recurrent movement and "loading" of the tips with patterning inks. The coating and subsequent drying process, often twists the cantilevers. Additionally, SPM tips are often bent because of aging, or coating, and usually must be discarded.

The assembly for a SPM tip includes a tip cartridge clipped or otherwise attached to a tip carrier. Static means such as glass beads are often inserted between the tip cartridge and tip carrier to hold the cantilevered tip attached to the tip carrier in a position angled away from the tip cartridge. Changing or otherwise manually manipulating the tip is accomplished by removing the tip carrier from the tip cartridge by unclipping or otherwise detaching the tip carrier. Replacement with a new tip attached to a tip carrier will not place the new tip in the identical orientation it was in with respect to the tip cartridge and the laser-photodiode arrangement.

Figure 2:
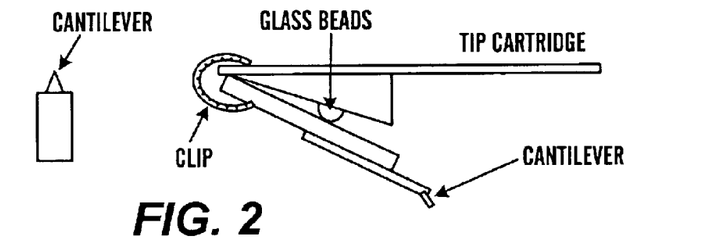
FIG. 2 shows the prior art design of a SPM tip carrier secured to a cartridge by means of a clip.
Figure 3:
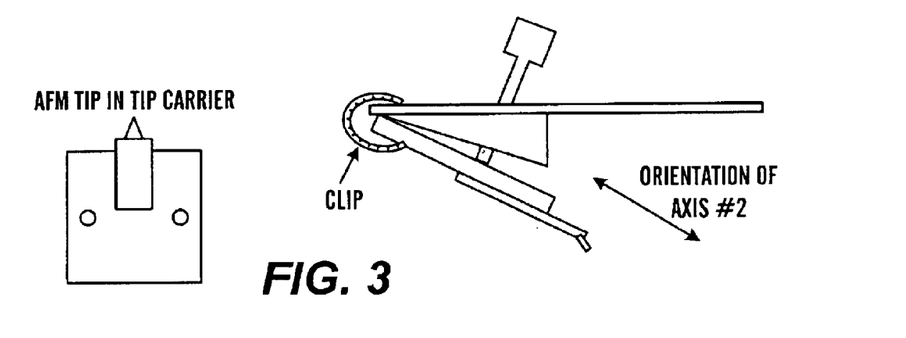
FIG. 3 shows a SPM tip carrier of the present invention having screws threaded through the tip cartridge allowing for the tuning of the tip.

Therefore, one embodiment of the present invention is a tunable tip holder applicable to all SPM needs. FIG. 2 shows the prior art design of a SPM tip carrier secured to a cartridge by means of a clip and two glass beads fit into the holes of the tip carrier. The glass beads are used to ensure proper carrier position of the cantilever. As the glass beads cannot be adjusted in any way however, the position of the cantilever cannot be tuned to overcome deviations in the positioning of the cantilever caused by events including twisting or bending of the cantilever, coating, cracking or drying of the tip. FIG. 3 shows one embodiment of the present invention in which the glass beads of the prior art are replaced with one or more screws threaded through the tip cartridge allowing for the tuning of the tip or adjustment of the angle of the tip relative to the tip cartridge. Adjustment of the screws controls the orientation of the cantilever surface about both axes perpendicular to the line of sight to the photodiode array. In a preferred embodiment of the present invention, two screws are used which allows for additional tuning of the SPM tip in the tip carrier by allowing the position of the tip carrier to be rotated about the axis perpendicular to the plane of the diagram when the screws are turned in the same direction and about a second axis #2, as shown in FIG. 3, when the screws are turned in opposite directions. This allows the reflected laser to be directed to the photodiode after the cantilever has been twisted. This not only saves money by saving SPM tips that would otherwise be discarded, but saves an enormous amount of valuable time in experimental execution and preparation—especially when tips are subject to any kind of modification such as coating.

A SPM includes an optical microscope objective positioned above the tip and the sample holder that allows the user to position the tip near the sample or substrate prior to beginning the scanning or lithography techniques. The optical microscope enables positioning the tip quickly and accurately. The link between the sample stage and the objective of the optical microscope is very long, resulting in a very loose mechanical connection causing vibration and oscillation of the optical microscope objective with respect to the sample causing the image to shake and blur. Therefore, one embodiment of the present invention is a brace that can be inserted between the optical microscope and the AFM stage, which prevents their relative movement. The brace is wedged between the AFM stage and the horizontal arm of the optical microscope supporting the objective piece of the optical microscope. It prevents relative movement of the microscope objective and the sample, thus stabilizing the images of the substrate on the video monitor. The brace allows for the capture of much higher resolution images from the monitor. The brace must be composed of a rigid material such as metal or lexan but the skilled artisan will recognize that any rigid material that can be formed to fit the instrument as a brace and sufficiently stiff to brace the optical microscope objective relative to the sample holder can be used. Preferably, the stabilization brace is removable allowing the user to clean or otherwise manipulate the tip and sample stage area of the SPM without interference from the brace and during AFM imaging in order to mechanically isolate the AFM stage from the optical microscope.

Figure 4:
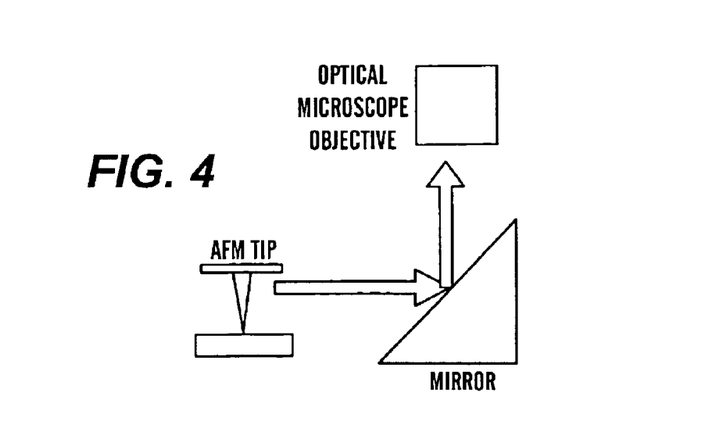
FIG. 4 shows a schematic of the SPM of the present invention having a mirror placed directly below the objective of the optical microscope and directly to one side of the sample and tip.

The position of the optical microscope objective above the tip and sample can make it difficult to properly align the tip near the sample for some applications. For this reason, one embodiment of the present application is a small right angle mirror for the optical microscope that allows the sample or tip to be viewed from the side. FIG. 4 shows a schematic of one embodiment of the present invention in which the mirror is placed directly below the objective of the optical microscope and directly to one side of the sample and/or tip. The view through the optical microscope can then be adjusted to focus on the reflection of the side view of the sample and the tip reflected in the mirror. This makes is much easier to align the tip on or near the sample or substrate for some scanning or lithography applications.

It is to be noted that the term "a" or "an" entity refers to one or more of that entity, including mixtures of the entities of two or more of the entities. As such, the terms "a" (or "an"), "one or more" and "at least one" are used interchangeably herein. It is also to be noted that the terms "comprising," "including," and "having" have been used interchangeably.

The following Example is provided to illustrate embodiments of the present invention and is not intended to limit the scope of the invention as set forth in the claims. The experiments and results in the following example are intended to develop a quantitative understanding of the dip-pen nanolithography process. More specifically, these procedures evaluate the degree of patterning reproducibility, how environmental parameters such as temperature, humidity and concentration of different solvents and vapors can affect the process, and how the process may vary over time to the establishment of concentration gradients, depletion of molecular ink, and evaporation of co-adsorbed solvents. Three different molecular inks, ODT, MHA and thiol-modified DNA strands were used to represent a variety of molecular character, spanning from the relatively non-polar ODT to DNA (an ionic polymer), as well as representing a range of molecular masses. These procedures evaluate the patterning process as a function of temperature, atmospheric vapor constituents (water and ethanol) presence of solvent molecules co-adsorbed on the AFM tip with the patterning molecules, and as a function of time.

EXAMPLE

Figure 5:
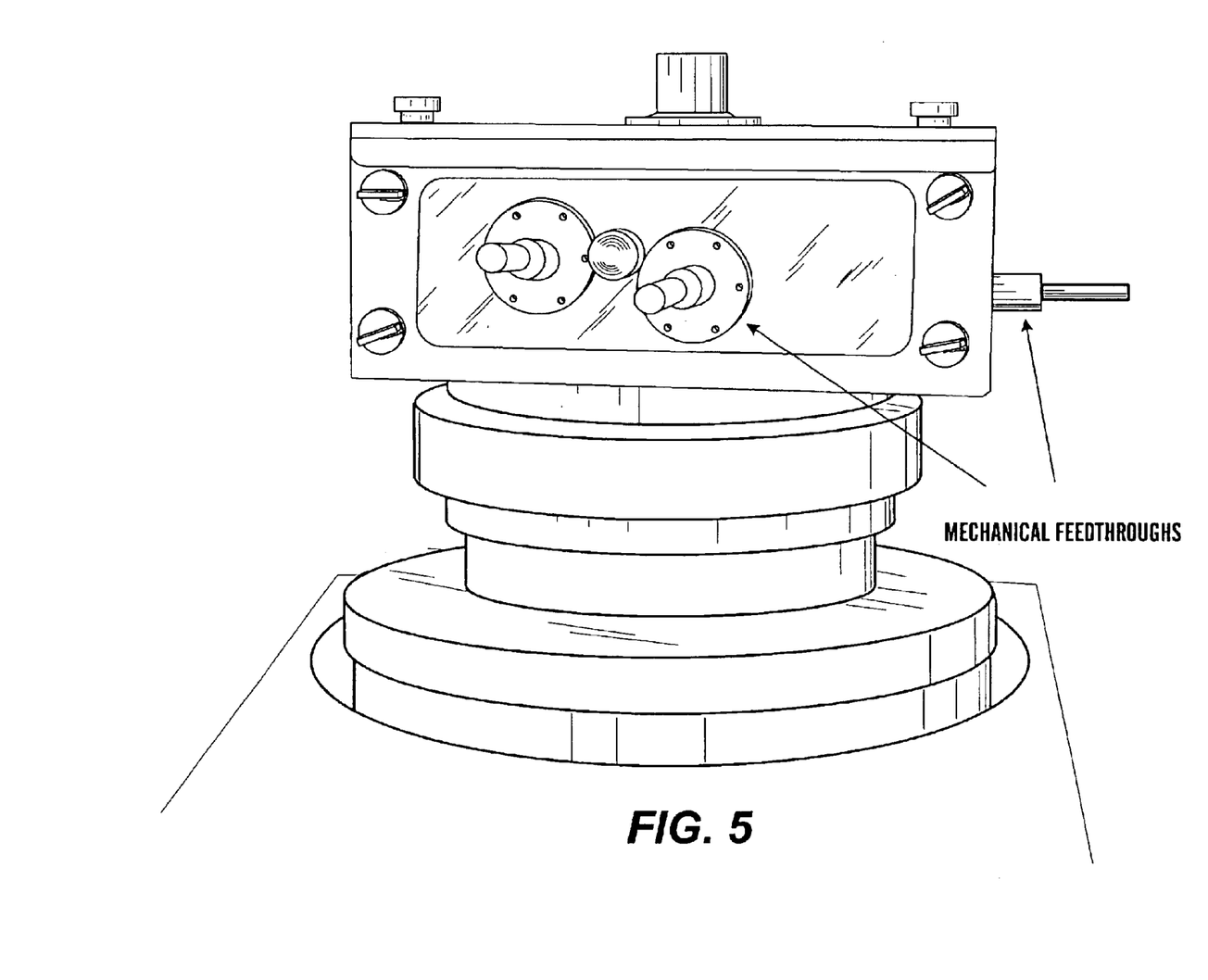
FIG. 5 illustrates a Thermomicroscopes AFM with an enclosure for control of temperature and atmospheric conditions having mechanical feedthroughs.

DNA patterning and AFM imaging were performed using a Thermomicroscopes CP and Thermomicroscopes Silicon Nitride, gold coated microlevers. A small chamber (FIG. 5) was also constructed for the Thermomicroscopes AFM from Plexiglas with mechanical feedthroughs, allowing control of the AFM while controlling the temperature as well as atmospheric conditions during the patterning process. Dry nitrogen was fed into the chamber or bubbled through liquids, allowing control of vapor constituents. Temperature was controlled with the addition of a heat exchanger immersed in either $LN_2$ or hot water. The small size of the chamber (about $10^{-3}$ that of a glove box) allowed for rapid change of environmental conductions. Humidity was monitored with a humidity probe. (Fisher Scientific, Fisherbrand Certified Traceable Digital Hygrometer/Thermometer, Instant Model) Air temperature was also monitored with the humidity probe, and sample temperature was monitored with a thermocouple. Experiments not requiring atmospheric control were done in open air. Polycrystalline gold surfaces were made via room temperature vacuum evaporation of about 60 nm of gold onto atomically smooth Si(100) wafers after a 10 nm titanium adhesion layer, without breaking vacuum between the two evaporations.

Solution Deposition

AFM tips were coated without prior cleaning by dipping for a few seconds in a 1 mM solution of octadecanethiol (ODT) or mercaptohexadecanoic acid (MHA) in acetonitrile. The tips were gently blown clean with dry air immediately after dipping.

Vapor Deposition

After the microlevers were soaked 30 min. in piranha solution (30% $H_2O_2$ and concentrated $H_2SO_4$) and rinsed with nanopure water, they were placed in a small (~10 ml) tin with 200 mg of ODT. The temperature was then raised to 45° C. for about 10 minutes. These conditions were found to result in AFM tips that were well coated with ODT. As vapor pressure is acutely dependent on the bulk heat of vaporization, it is believed that this vapor deposition process is only applicable to molecules with bulk heats of vaporization that lie within a very narrow range. ODT has a vapor pressure of about $2\times10^{-5}$ Torr at 45° C., where MHA requires a temperature of about 80° C. to achieve this vapor pressure. Although MHA was successfully applied via vapor deposition at 80° C., the molecule proved to be immobile without the presence of a co-adsorbed solvent (see below: MHA dependence on co-adsorbed solvent). Larger molecules, with lower equilibrium vapor pressure—and especially biological molecules, which are much less thermally stable—are anticipated to decompose before evaporating.

Measurement of Molecular Diffusion Rate

Figure 6A:
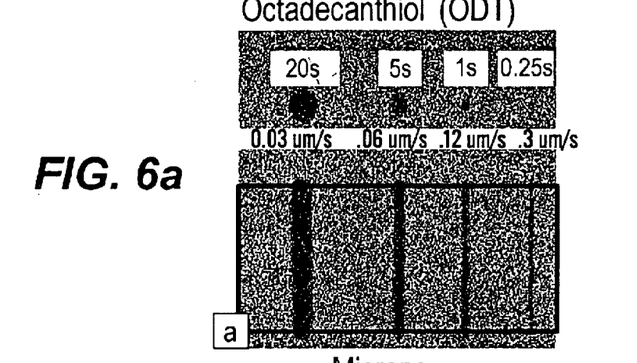
FIG. 6a. Lines generated via the DPN of ODT (Octadecanethiol) on a gold surface appear dark (low friction) on LFM (Lateral Force Microscopy).

Dots and lines were DPN-patterned on a gold surface at 26% relative humidity and about 27° C. The lines were patterned vertically with a single pass at given speeds. The surface was then imaged with the same AFM tip, using horizontal scans in Lateral Force Microscopy mode (LFM, see FIGS. 6a, 6c low friction is shown as dark). Dot dwell times and line writing speeds are labeled on the LFM image. The horizontal scans that traversed the patterned lines (shown in boxed region in FIGS. 6a, 6c) were averaged together to yield the cross sectional average of the LFM signal (shown in FIGS. 6b, 6d). ODT is lower friction than gold while MHA and DNA are higher friction than gold. All images shown have been unedited except for, in some cases, standard flattening and line leveling (background subtraction).

Protocol for Patterning of DNA

The patterning of DNA presented two unique challenges: adsorbing the hydrophilic thiol-modified DNA onto hydrophobic AFM tips, and detecting resulting DNA patterns.

DNA AFM Tip Preparation

Patterning DNA requires the adsorption of bulk DNA solution on the AFM tip. However, the reflective back of the cantilever must remain clean. The AFM cantilever was first dipped in a 1 mM solution of ODT in acetonitrile, resulting in a hydrophilic monolayer on the back of the gold-coated cantilever. Then the bottom of the cantilever (the "tip side") was coated with about 5 mm fresh gold via vacuum evaporation after a 5 nm layer of titanium. Subsequent immersion in DNA solution resulted in the adhesion of a significant drop of solution on the AFM tip, while the back of the cantilever remained clean.

Detection of Patterned Marks of DNA

After patterning, the substrate was rinsed in nanopure water. The patterned structures of DNA appeared as high friction in LFM on the gold surface. However, the possibility of impurities in the DNA requires that the presence of the DNA surface patterns be verified via hybridization experiments. 13 nm gold nanoparticles, derivatized with the thiol-modified DNA complement of the patterned DNA were applied to the gold surface after DNA patterning. The subsequent adsorption of gold nanoparticles via hybridization was imaged in AFM topographs.

Results

Molecular Diffusion Rates of ODT and MHA as a Function of Writing Speed

Figure 6B:
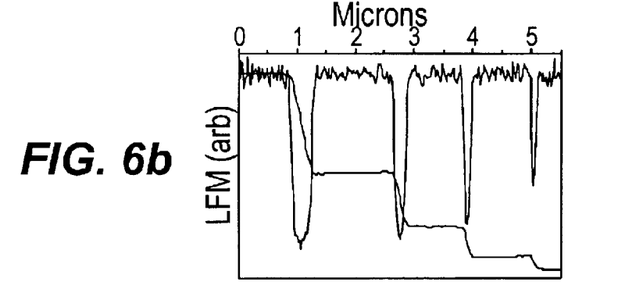
FIG. 6b. Averaging all the horizontally scanned lines of FIG. 6a in the box yields and average cross section and an integrated peak area (the "stepped line" in the cross section shown below) from which normalized line widths are calculated.
Figure 6C:
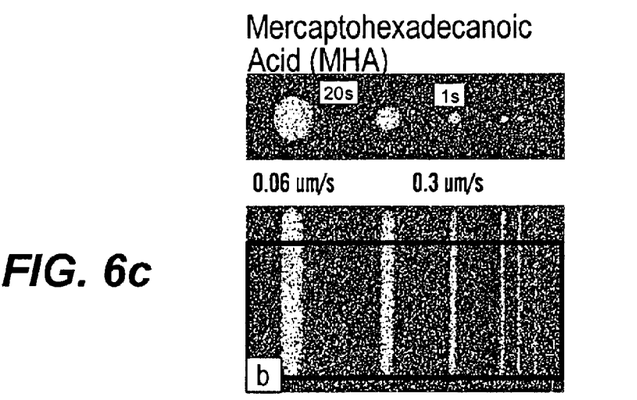
FIG. 6c. Lines generated via the DPN of MHA (Mercaptohexadecanoic Acid) on a gold surface appear dark (low friction) on LFM (Lateral Force Microscopy).
Figure 6D:
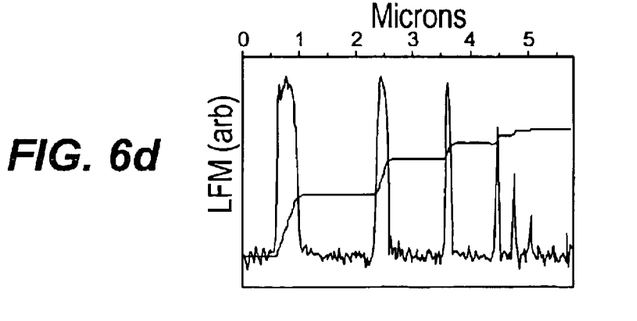
FIG. 6d. Averaging all the horizontally scanned lines of FIG. 6c in the box yields and average cross section and an integrated peak area (the "stepped line" in the cross section shown below) from which normalized line widths are calculated.

ODT and MHA are known to form well-packed dense monolayers with a molecular surface density of $4.64\times10^{14}$ molecules/$cm^2$. Therefore, the surface coverage of the lines, and thus the molecular dose to the surface is directly proportional to the width of the lines. The LFM signal corresponding to the widest lines usually represents full monolayer coverage. At higher patterning speeds, the patterned lines are no longer continuous, as the ODT molecules self-assemble in isolated patches, and the averaged LFM signal does not reach the level attained for slower patterning (wider lines). Effective line width was calculated by dividing the area of the cross sectional LFM peak (as shown in FIG. 6b) by the signal height that corresponds to full coverage.

Figure 7:
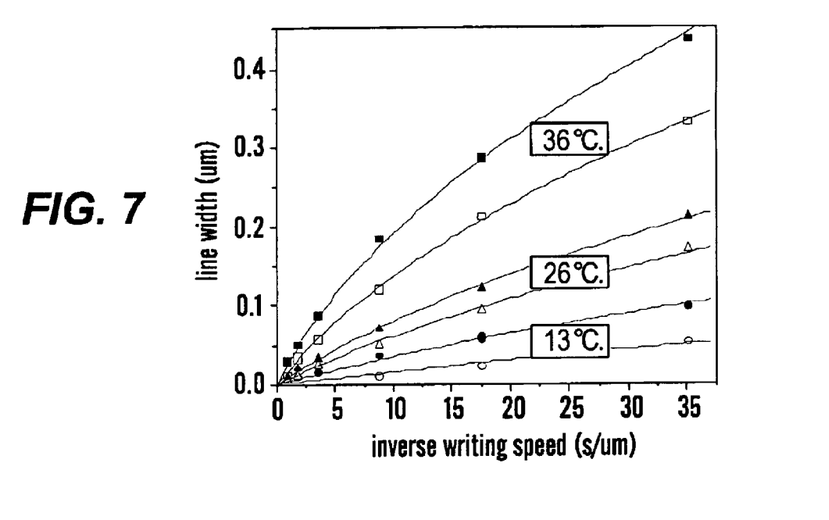
FIG. 7. Line widths for different patterning speeds from three data sets showing that the rate of molecular diffusion decreases with increased line width, resulting in a less-than linear dependence of line width on inverse writing speed.

Line width was graphed against the reciprocal of the writing speed in FIG. 7 for three data sets. If the rate of molecular transport from the AFM tip were constant with respect to line width, there would be a direct relationship between line width and inverse writing speed. The less-than-linear relationship of line width on inverse writing speed indicates that the rate of molecular transport from the AFM tip decreases with wider lines (lower writing speeds). The wider lines present an increased distance for the molecules to travel across before adsorbing on the gold surface. This extra distance could reduce the rate of molecular transport for two reasons:

1) The increased distance effectively reduces the gradient in molecular density, the driving force behind molecular diffusion;
2) The increased time spent on the monolayer surface by the patterning molecules during diffusion to the monolayer edge may result in increased evaporation. For the case of ODT, the methyl surface of the monolayer is lower energy than that of bulk ODT. The higher temperature data (35° C.) showed a greater reduction in molecular transport with increased line width than do data collected at room temperature (27° C.).

In order to compare diffusion rates for different experiments, it is necessary to arrive at a single "characteristic diffusion rate" for a given set of patterned lines. Therefore, diffusion rates are calculated for effective line widths of 100 nm. At this small line width, the diffusion rate is still reasonably unaffected by line width, as is evident from the near agreement between the data corresponding to 100 nm line width and the linear extrapolation in FIG. 7.

Humidity Independence of Molecular Diffusion Rate of ODT

Figure 8:
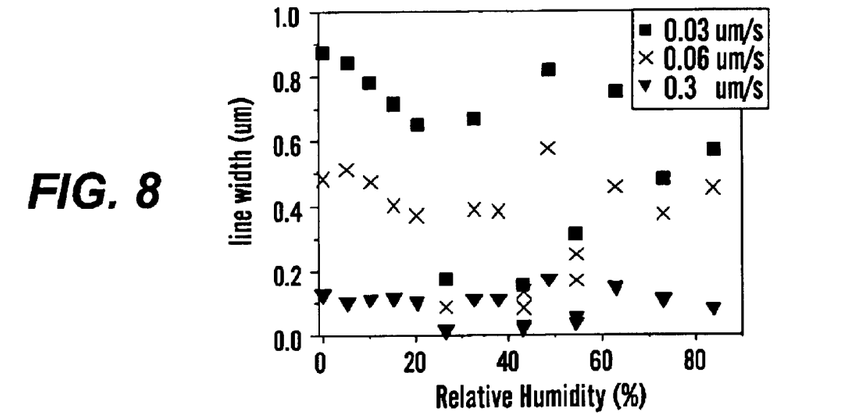
FIG. 8. ODT was vapor deposited on the AFM tip. The diffusion rate of ODT exhibited no dependence on relative humidity, as indicated by the invariant line widths with changing relative humidity.
Figure 9:
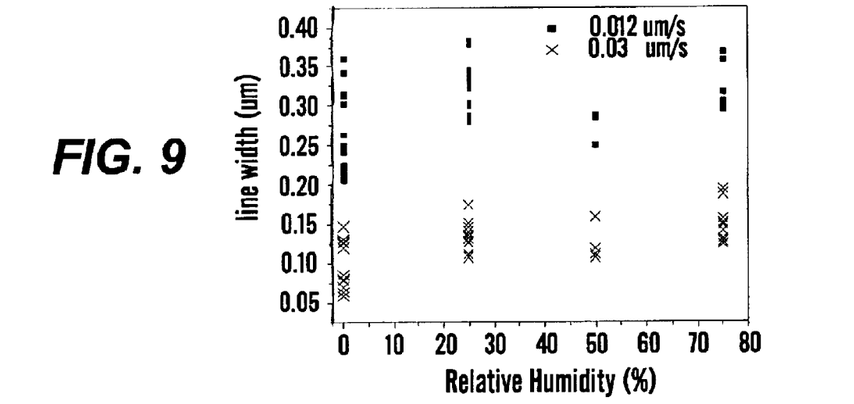
FIG. 9. The diffusion rate of ODT (solution deposited on the AFM tip and patterned) showed no significant increase with increased relative humidity.

The results of humidity dependent DPN patterning are shown in FIG. 8 for vapor deposited ODT. Apart from some seemingly random fluctuations, no humidity dependence was shown from 0% relative humidity to 100% humidity. The line widths indicated a molecular diffusion rate of about $5 \times 10^5$ molecules/s. When ODT was solution deposited on an AFM tip, the diffusion rate was also independent of relative humidity, as is shown in FIG. 9.

The concentration of molecules on the AFM tip is very sensitive to the conditions present during tip coating. Therefore, it cannot be assumed that the writing speeds will be the same for two tips that have undergone identical tip coating protocols. Furthermore, it has also been found that it cannot be assumed that the writing speeds will be the same for the same tip after a long period of time.

MHA Dependence on Co-Adsorbed Solvent

Figure 10:
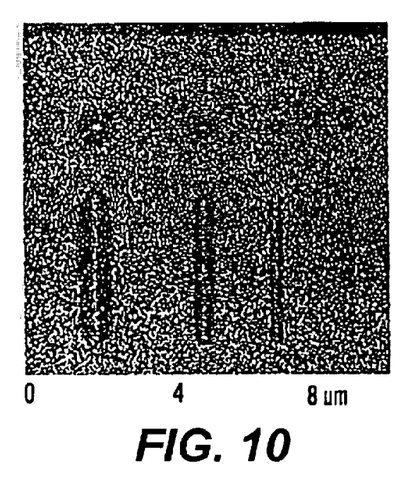
FIG. 10. MHA vapor deposited on the AFM tip did not exhibit molecular mobility. Surface water (dark) diffused away from the multilayers of MHA (light) deposited by the AFM tip.

Although MHA is easily patterned when the tip is coated via solution deposition, as described above, after the tip was left under high vacuum for 2 hours, MHA proved not to be patternable. Furthermore, when MNA was deposited via vapor deposition (10 minutes, over 70° C.), it did not transport from the tip in a diffusive manner. Instead, the molecules seemed to pile up under the AFM tip, forming thin lines of bulk MHA at 100% relative humidity. Marks as high as 20 nm have been deposited by this method. A low friction substance (dark), presumed to be water, readily diffused across the gold surface from the AFM tip (FIG. 10) while a high friction substance, presumed to be MHA, remained relatively immobile on the surface.

Solution Deposition of MHA—Humidity Dependence

Figure 11:
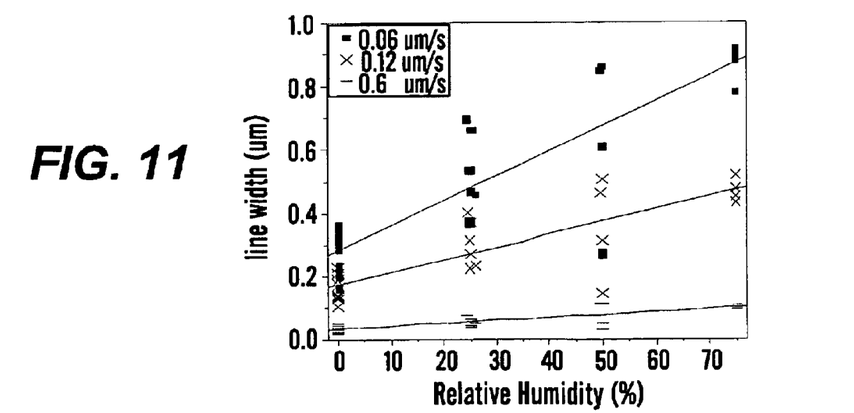
FIG. 11. When MHA was (acetonitrile) solution deposited on the AFM tip, there was a slight increase in the rate of molecular diffusion with increased relative humidity. Best fit lines, along with the associated writing speed are shown.

When the AFM tip is coated via solution deposition, the co-adsorbed solvent (acetonitrile in this case) may have an effect on the resulting patterning process. When MHA was found not to exhibit diffusive behavior when vapor deposited, the solution deposition (and thus the presence of the acetonitrile) resulted in adequate molecular diffusion. The resulting patterning process exhibited a molecular diffusion rate that has a small dependence on humidity for solution deposited MHA (FIG. 11).

Qualitative Effect of Water and Ethanol Vapors

Figure 12A:
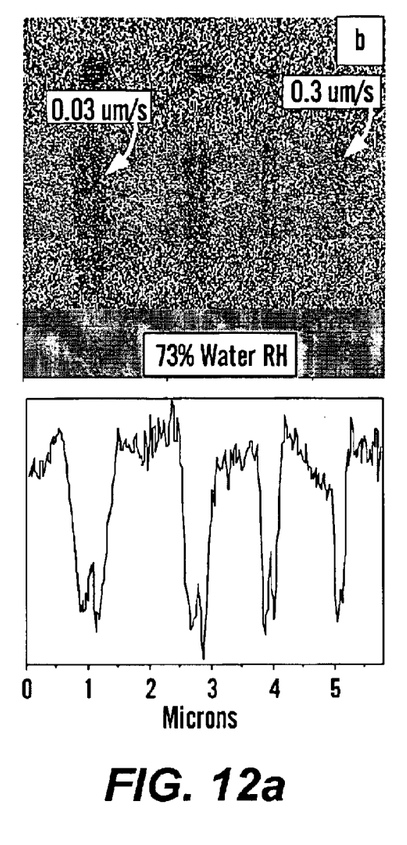
FIG. 12a. An environment high in water vapor yielded lines drawn from ODT (vapor deposited on AFM tip) that were well defined, with little coverage in the middle.
Figure 12B:
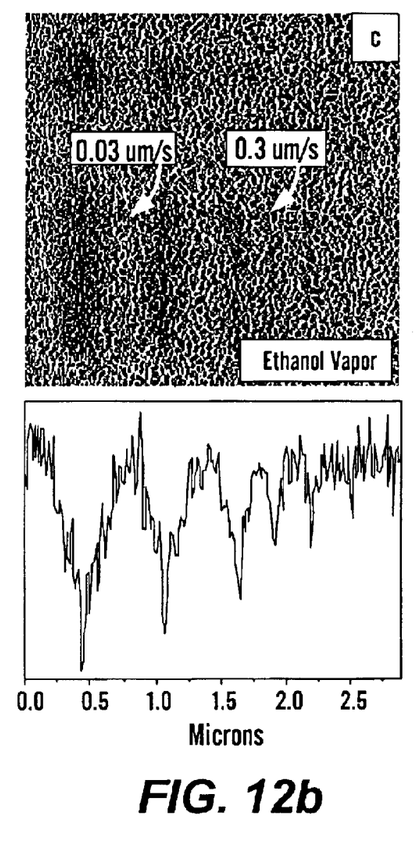
FIG. 12b. In an environment of ethanol vapors, ODT lines were strongly peaked in the middle and had poorly defined edges.

Although relative humidity and ethanol vapor content did not measurably affect the rate of ODT molecular transport, the presence of each had significant effects on the molecular distribution in the DPN patterns. While high relative humidity often resulted in double lines (FIG. 12a), with little deposition of ODT in the middle of the line, high concentration of vapors of ethanol (in which ODT is very soluble) resulted in an ODT surface distribution that was very peaked in the middle (FIG. 12b). Furthermore, patterning in ethanol vapors resulted in very poor edge resolution of the resulting line. Given that there is a meniscus between the AFM tip and the gold surface, the lowest energy state for ODT would be on the surface if the meniscus was water, as the nonpolar molecule is not soluble in water. However, ODT is very soluble in ethanol and the molecule should readily diffuse through a meniscus of ethanol.

Time Dependence of Diffusion Rate

The line widths in FIG. 9 and FIG. 11 show a significant amount of scatter (as much as 100% of the average line width). This variation proves to be both systematic over time, and random in nature. FIG. 9 at bottom shows the variation of line width for solution-deposited ODT as a function of time under each of the labeled atmospheric conditions. There is a clear decrease with time in the rate of molecular diffusion, with a time constant of about 30 minutes. Furthermore, there is an abrupt increase in the rate of molecular diffusion after a pause without writing. This increase could be due to the equilibration of the acetonitrile and ODT concentration on the AFM tip.

Temperature Dependence

Figure 13A:
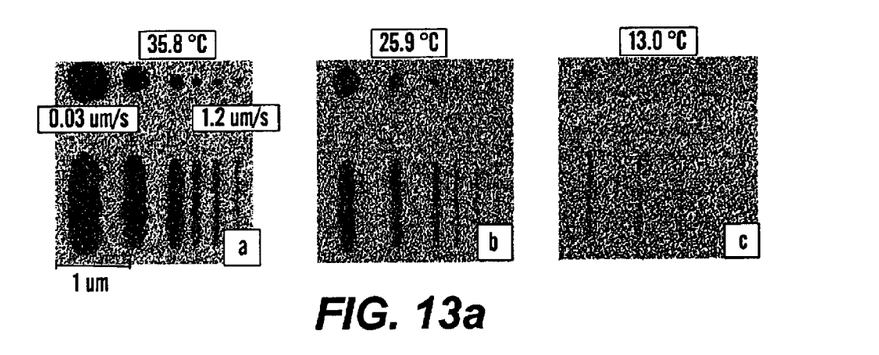
FIG. 13a. ODT (vapor deposited on AFM tip) is patterned at different temperatures at 0% relative humidity.
Figure 13B:
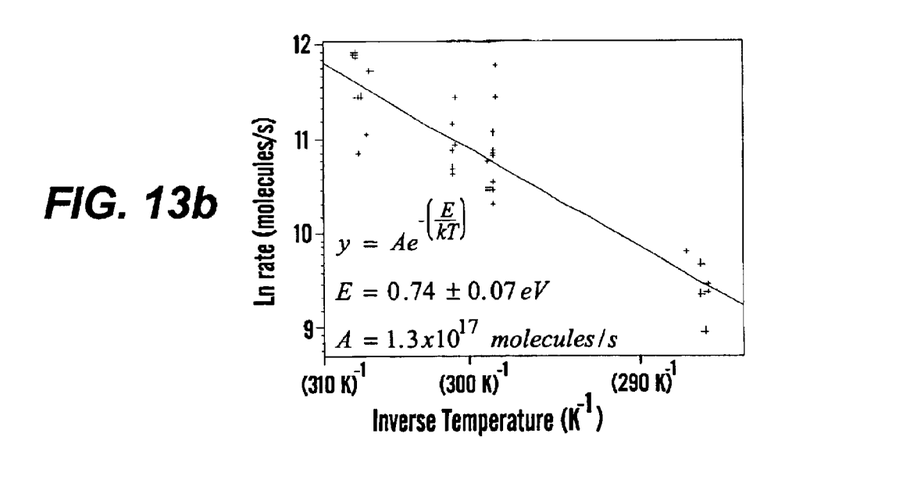
FIG. 13b. An Arrhenius plot of diffusion rates yields an activation barrier to diffusion of 1 eV.

The molecular diffusion rate of both ODT (solution deposition and vapor deposition) and MHA (solution deposited) exhibit exponential temperature dependence (see FIG. 13a). An exponential curve fit yields an energy barrier to diffusion of about 1 eV for ODT (see FIG. 13b).

Attempts to DPN DNA

DNA is a large, hydrophilic, ionic polymer. It was anticipated that the multiple salt and hydrogen bonds would result in an energy barrier to diffusion that is high enough to prohibit diffusive transport. No diffusive transport was observed for DNA (1 mer, 12 mer, or 22 mer) in environments of water vapor or ethanol. However, if enough DNA oligomers are adsorbed on an AFM tip, it was found that the coating can be made to "melt" at high relative humidity (RH>90%), when enough waters of hydration adsorb to turn the DNA salt coating into a solution. The resulting solution runs off the AFM tip in an uncontrolled fashion, resulting in pools of DNA solution ranging in size from 1 μm to over 100 μm, depending on the amount of DNA on the tip. This process is very unlike the molecular diffusion transport discussed above for ODT and MHA.

Figure 14:
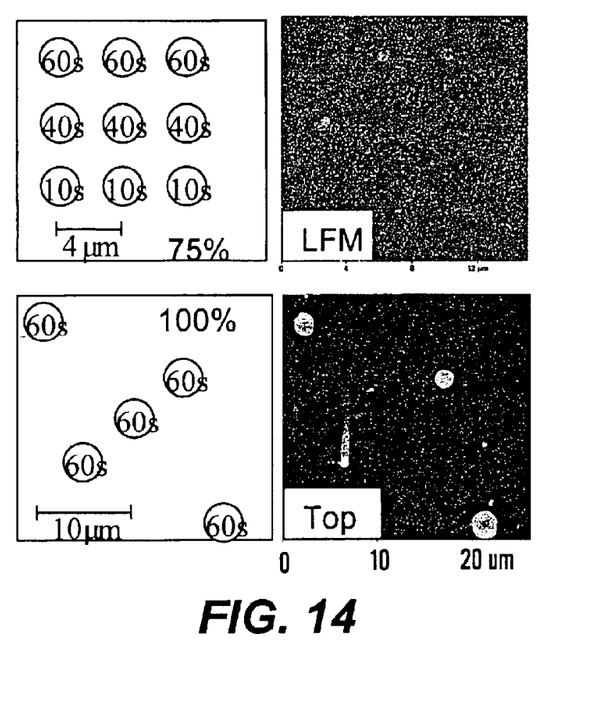
FIG. 14. DNA patterning protocols (left) irreproducibly leave DNA on a gold surface. DNA is higher friction than gold as indicated in the LFM (upper right), and will bind gold nanoparticles derivatized with complementary strands as indicated by the topograph (lower right).

The level of reproducibility of the DNA patterning process is represented in FIG. 14. At left is shown the dwell times of the AFM tip on the substrate during the patterning process. At right is shown the resulting LFM, and topograph (top and bottom respectively). The images reflect both an inability to reliably produce DNA marks using DPN and a lack of control over the size of the resulting DNA marks when one is produced.

Control over the bulk behavior of the DNA solution can be improved with the addition of salts and surfactants. After purification, the DNA (in solution) was mixed with salts in the desired ratio. Afterwards, the mixture was dried under a nitrogen atmosphere. The DNA mixture was then exposed to enough humidity for the proper amount of hydration to render a workable solution. Therefore, DNA and salt concentrations are not given, but rather the ratio of number of salt ions to the number of DNA bases in the solution (Salt to Base Ratio, or SBR), and the relative humidity during the experiment. The extra adsorption of water achieved with the addition of $MgCl_2$ (SBR=27) allowed the DNA/salt mixture to become a liquid at normal humidities in the laboratory (35%-45%). However, the transition from bulk solid to solution was still very abrupt.

Figure 15:
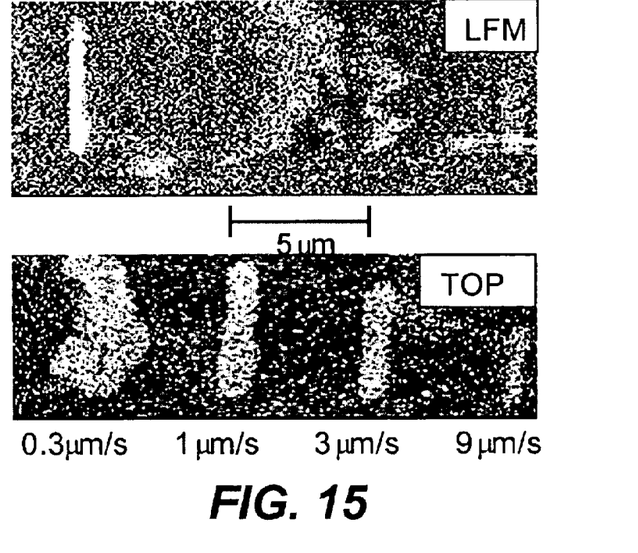
FIG. 15a. Lines patterned with DNA (assisted with a surfactant) were detectable as high friction on LFM.
FIG. 15b. After hybridization with DNA-derivatized nanoparticles, these areas were visible on an AFM topograph of a different but similar sample.

The addition of a surfactant, tridodecyclmethylamine chloride (TDMA) at SBR=27, resulted in an oil-like liquid in an environment of 50% relative humidity. This solution had more controllable patterning behavior as is indicated in FIG. 15. An LFM of a sample after patterning and rinsing with nanopure water is pictured in FIG. 15a. In FIG. 15b, a topograph of a different but similar sample is shown after hybridization with nanoparticles. The images indicate the potential for reproducible sub micron patterning of DNA.

Furthermore, this bulk patterning process is close to 3 orders of magnitude faster than the diffusive transport responsible for the DPN patterning of ODT and MHA. However, this bulk deposition process presents a difficulty that is not present in the diffusive transport of DPN-generated monolayer patterns of ODT: when rinsing the sample after patterning, the excess of DNA present in the patterns is deposited on the nonpatterned portions of the gold. This difficulty (which is overcome in nanografting by means of a surface resist) is evident from the small patches of bound nanoparticles in nonpatterned areas.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A method of investigating the diffusive behavior of a molecule, comprising:

providing a substrate;

providing a stage for holding a substrate;

providing an optical microscope objective;

providing a scanning probe microscope tip;

providing an atmosphere control enclosure defining an enclosed space, wherein said atmosphere control enclosure surrounds said scanning probe microscope tip, said stage for holding a substrate and said substrate, wherein said atmosphere control enclosure surrounds said scanning probe microscope tip and said stage for holding a substrate and wherein said atmosphere control enclosure comprises a top of flexible material having an airtight seal between said flexible too and said optical microscope objective;

providing an atmosphere control apparatus wherein said atmosphere control apparatus controls at least one atmospheric parameter selected from the group consisting of temperature, relative humidity and gas composition;

coating the tip with a composition comprising the molecule; and evaluating the diffusion of the molecule from the tip to the substrate.

* * * * *